(12) United States Patent
Bjorklund

(10) Patent No.: US 6,494,411 B1
(45) Date of Patent: Dec. 17, 2002

(54) REMOVABLE CABLE SUPPORT APPARATUS

(75) Inventor: Brian P. Bjorklund, Lilburn, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/873,743

(22) Filed: Jun. 4, 2001

(51) Int. Cl.$^7$ ................................. F16L 3/00
(52) U.S. Cl. ..................... 248/49; 248/68.1; 248/69; 248/228.6
(58) Field of Search ................... 248/49, 68.1, 72, 248/73, 71, 74.1, 74.4, 689, 226.11, 227.1, 228.6, 230.6, 315, 316.8

(56) References Cited

U.S. PATENT DOCUMENTS

| | | |
|---|---|---|
| 427,642 A | 5/1890 | Wack |
| 1,365,632 A * | 1/1921 | Pleister .................. 248/69 |
| 1,554,118 A | 9/1925 | Moran |
| 2,689,995 A | 9/1954 | Smith |
| 2,711,872 A * | 6/1955 | Lampke ................ 248/103 |
| 2,749,068 A | 6/1956 | Wayman |
| 3,204,908 A * | 9/1965 | Brown .................. 248/228.6 |
| 3,276,800 A * | 10/1966 | Loudon et al. .......... 403/397 |
| 3,652,780 A | 3/1972 | Wilson |
| 3,659,319 A * | 5/1972 | Erickson ............... 24/304 |
| 3,820,758 A | 6/1974 | Berg, Jr. et al. |
| 4,097,015 A | 6/1978 | Frishman |
| D263,021 S | 2/1982 | Siegfried |
| 4,526,428 A * | 7/1985 | Sachs .................... 439/92 |
| 4,870,722 A * | 10/1989 | Shell, Jr. ................ 24/16 R |
| 4,903,929 A | 2/1990 | Hoffman |
| 5,022,615 A | 6/1991 | Parks |
| 5,169,099 A | 12/1992 | Yang |
| D359,629 S | 6/1995 | Korkowski |
| 5,697,811 A | 12/1997 | Pickles et al. |
| 5,738,312 A | 4/1998 | Koch |
| 5,765,698 A | 6/1998 | Bullivant |
| 5,788,087 A | 8/1998 | Orlando |
| 5,794,895 A | 8/1998 | Besserer et al. |
| 5,868,362 A * | 2/1999 | Daoud ................... 248/71 |
| 5,921,402 A | 7/1999 | Magenheimer |
| 6,102,214 A | 8/2000 | Mendoza |
| 6,170,784 B1 | 1/2001 | MacDonald et al. |
| 6,245,998 B1 | 6/2001 | Curry et al. |

* cited by examiner

Primary Examiner—Anita King
(74) Attorney, Agent, or Firm—Kirkpatrick & Lockhart LLP

(57) ABSTRACT

A cable-supporting apparatus. One embodiment of the invention includes a rigid support member that may be attached to a framework that supports one or more components. At least one cable support member is attached to the rigid support member for receiving a portion of at least one cable therethrough. The cable support members may comprise split rings that each defines central cable-receiving area that is surrounded by rigid portions of the split ring.

7 Claims, 5 Drawing Sheets

REMOVABLE CABLE SUPPORT APPARATUS

CROSS-REFERENCE TO RELATED APPLICATIONS Not applicable.

FEDERALLY SPONSORED RESEARCH

Not applicable.

BACKGROUND OF THE INVENTION

1. Field of the Invention

The subject invention relates to guides and support members for members such as wires, cables and conduits and, more particularly, to guides for supporting multiple wires and/or cables while providing easy access thereto.

2. Description of the Invention Background

One might surmise that there are millions of miles of wires and cables distributed throughout the world for transmitting a variety of different electrical, optical, data, etc. signals between pieces of equipment. Regardless of the type of signal involved, a common installation scenario may involve one or more common locations wherein several of such wires and cables are brought together for interconnection with various electrical or optical components and/or other wires and cables. Junction boxes, electrical cabinets and racks of electrical components are examples of such locations.

In applications wherein several wires and cables must enter a cabinet, junction box, etc., it is often difficult for the electricians and installers to manage the distribution of the wires into and out of the cabinet in an orderly manner so that the components to which the wires are attached may be easily and safely accessed and that specific wire or wires may be easily traced as needed. In the past, wire trays have been employed for supporting a plurality of wires and cables entering an electrical cabinet. A common wire tray may comprise an elongated trough that is sized to receive a plurality of wires therein. In some applications, the tops of the trays are left open and the wires are simply laid in the tray. If desired, a cover may be placed over the tray. Such trays, because of their enclosed nature, hamper quick identification of a specific wire or wires and, if placed in a vertical orientation, are commonly covered to retain the wires within the tray.

Although the above-mentioned wire and cable management problems occur wherever several wires and cables enter a cabinet, junction box, rack, etc. and are essentially encountered in one form or another in all industries, one industry wherein such problems can be particularly acute is in the telecommunications industry. For example, with the advent of the Internet, a practice employed in the telecommunications industry involves the use of digital subscriber lines ("DSL") that allow data to be transmitted over a dedicated digital circuit using ordinary copper telephone lines between a business or a residence and an Internet service provider. DSL technology transmits at higher speeds than traditional analog technology. In situations wherein a customer is located a great distance from the central office, conventional analog call-switching equipment along with digital modems known as DSL multiplexers, sometimes referred to as "D-slams" are employed in connection with remote terminal arrangements that contain all of the telephone lines servicing a particular geographical area.

FIG. 1 illustrates some of the equipment commonly installed within a remote terminal 10. Located within the remote terminal are a number of protector bays 12 that are mounted to a framework 14 that permits each bay to be partially pivoted relative to the framework 14 to permit access in to the rear of the bay 12. Each protector bay 12 comprises a 100 fuses 16 commonly referred to as "protector blocks". When used, each protector block 16 has four cables 18 which transmit the telephone and ADSL signals. FIG. 1 depicts several of such wires 18 attached to various protector blocks 16. The reader will appreciate that such mass of wires 18 will increase as more of the protector blocks 16 are employed. Such mass of wires 18 hanging in front of the protector bays 12 makes it difficult and time consuming to locate a particular protector block 16 and trace the wires 18 attached to that particular protector block.

Thus, there is a need for a cable support apparatus that can support a portion of one or more cables in a desired orientation that can be easily attached and detached from adjacent support structure.

There is a further need for a cable support apparatus that has the above-mentioned features and that permits wires to be inserted into the cable support apparatus and removed therefrom without the use of tools.

There is still another need for a cable support apparatus that has one or more of the above-mentioned features and that permits the wires to be easily observed and identified without having to be removed from the apparatus.

There is another need for a cable support apparatus that has one or more of the above-mentioned features and that is relatively inexpensive to manufacture and easy to install and reposition if necessary.

Another need exists for a cable support apparatus that has one or more of the above-mentioned features and that can be effectively employed in connection with other wire and cable management applications.

SUMMARY OF THE INVENTION

In accordance with one form of the present invention, there is provided a cable support apparatus that includes a clamp that has a cable-receiving support member attached thereto. The cable-receiving support member defines a cable-receiving area having a perimeter surrounded by a rigid barrier. The rigid barrier has an opening therethrough through which at least one cable may be inserted.

Another embodiment of the present invention comprises a means for supporting a cable and means for removably clamping attached that is to the means for supporting a cable.

Yet another embodiment of the present invention comprises a cable supporting apparatus that includes a C-shaped body that has a threaded thumbscrew attached thereto. A split ring that defines a central cable-receiving area having a perimeter surrounded by rigid portions of the split ring is attached to the C-shaped body. The split ring has an access area for permitting a cable to be inserted into the cable-receiving area.

Another embodiment of the present invention comprises a cable support apparatus that includes a clamp that has a cable-receiving ring attached thereto.

Another embodiment of the present invention comprises a method of supporting at least one cable attached to components supported by a framework. The method may include clamping a split ring that defines a central cable-receiving area that has a perimeter surrounded by rigid members and an opening between the rigid members to permit a cable to be inserted therethrough onto the framework. The method further includes inserting at least one cable through the opening into the cable-receiving area.

Those of ordinary skill in the art will appreciate that the various embodiments of the present invention provide unique and novel methods of organizing and supporting a plurality of cables or other transfer mediums that are attached to components supported within a framework. These details, features and advantages will become further apparent as the following detailed description of the embodiments proceeds.

BRIEF DESCRIPTION OF THE DRAWINGS

In the accompanying Figures, there are shown present embodiments of the invention wherein like reference numerals are employed to designate like parts and wherein.

DETAILED DESCRIPTION OF THE EMBODIMENTS OF THE INVENTION

Figure 1:
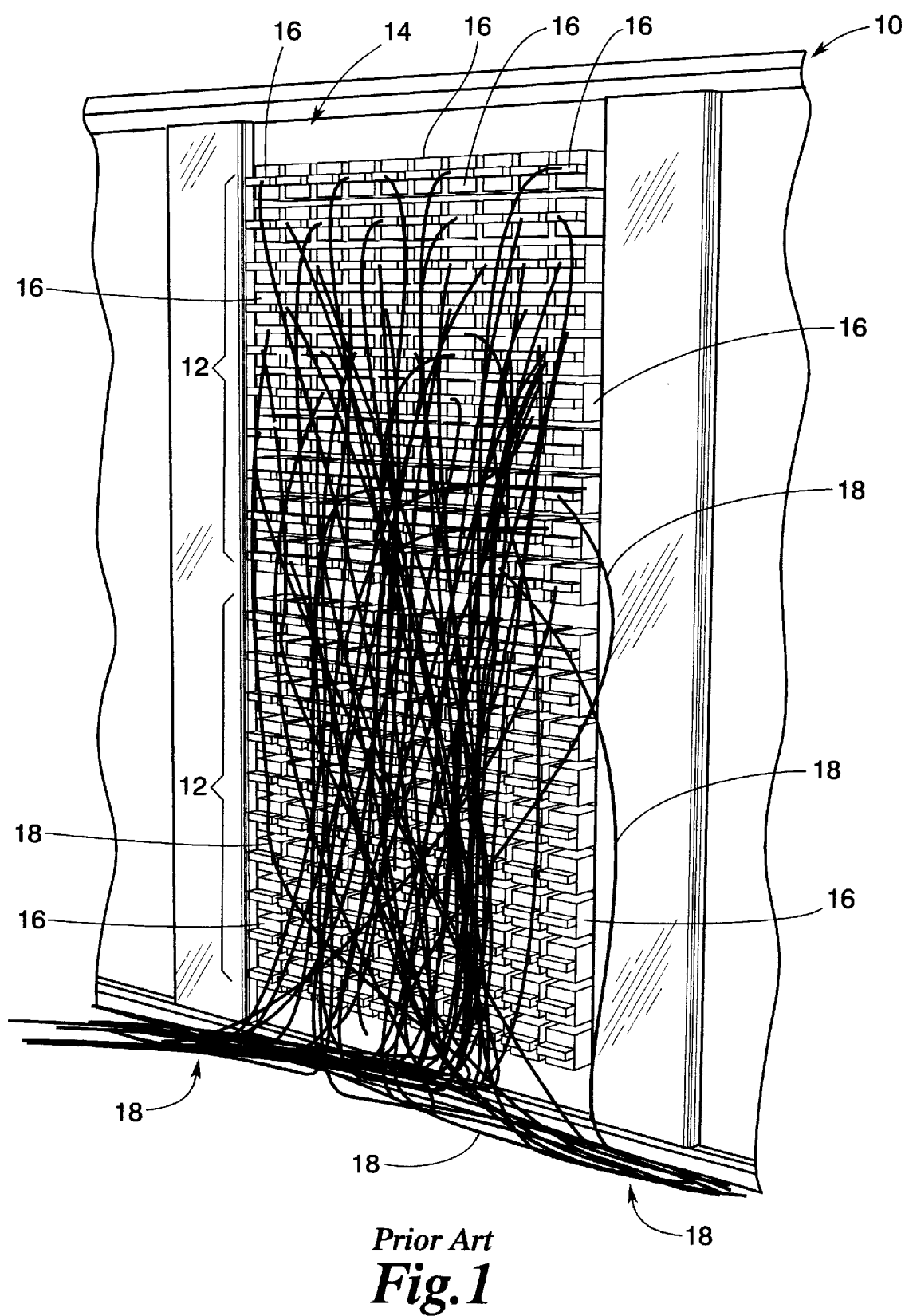
FIG. 1 is a partial perspective view of a pair of typical protector bays.

Referring now to the drawings for the purposes of illustrating the present preferred embodiments of the invention only and not for the purposes of limiting the same, the Figures illustrate embodiments of the present invention that may be used in connection with managing a plurality of wires/cables 18 attached to protector blocks 16 employed in the telecommunications industry. As the present Detailed Description proceeds, those of ordinary skill in the art will appreciate that the various embodiments of the present invention may be employed in a variety of settings and applications wherein it may be advantageous to support a plurality of wires, cables, etc. in an orderly fashion. Thus, the scope of protection afforded to the various embodiments of the present invention should not be limited to use in connection with the protector bays employed in connection with various telecommunications applications. The various embodiments are described herein as being adapted for use with "cables". As used herein, the term "cables" may refer to conductors covered with an insulating medium. The term "cables" may also refer to mediums for supporting optical signals, i.e., fiber optic cables. The term "cables" may encompass conduits used to transfer fluid or liquid mediums, etc. Thus, the present invention finds utility in the management of a variety of different flexible and non-flexible transfer mediums and thus, should not be limited solely to use with electrical cables and wires. As used herein, the term "framework" may encompass any structure that supports one or more components to which one or more cables are attached such as, but not limited to, junction boxes, electrical cabinets, electrical racks, etc.

Figure 2:
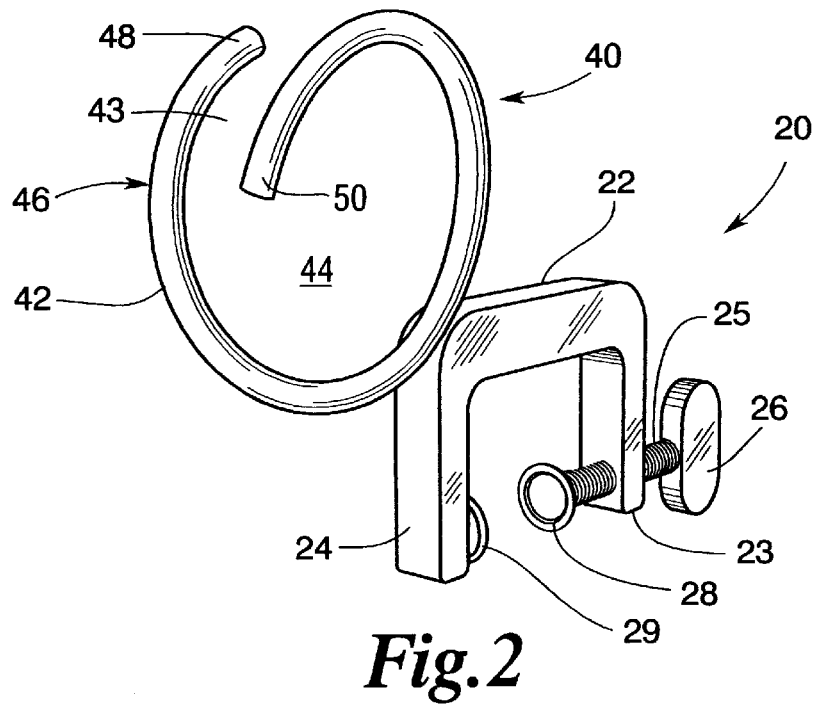
FIG. 2 is a perspective view of one embodiment of the cable support apparatus of the present invention.
Figure 3:
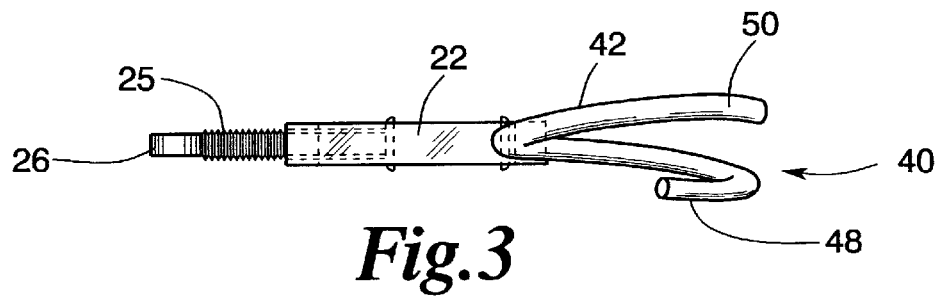
FIG. 3 is a top view of the cable support apparatus of FIG. 2.
Figure 4:
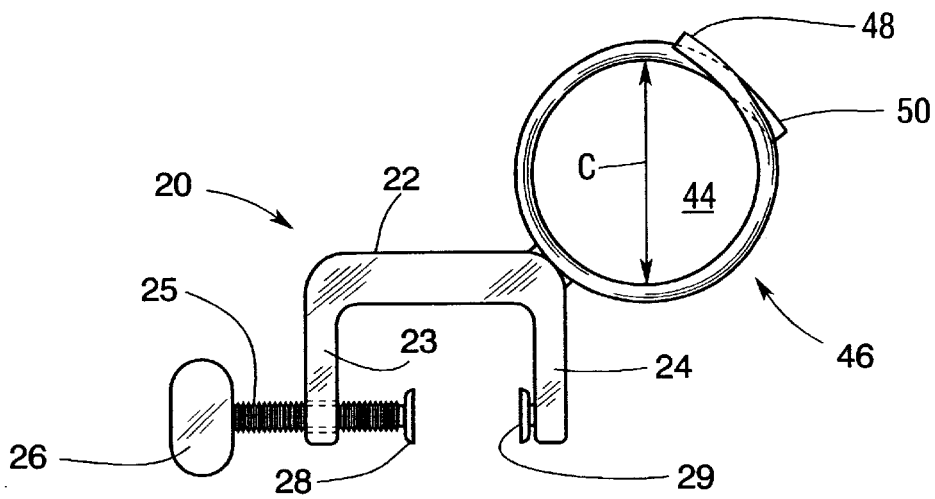
FIG. 4 is a left side view of the cable support apparatus of FIGS. 2 & 3.
Figure 5:
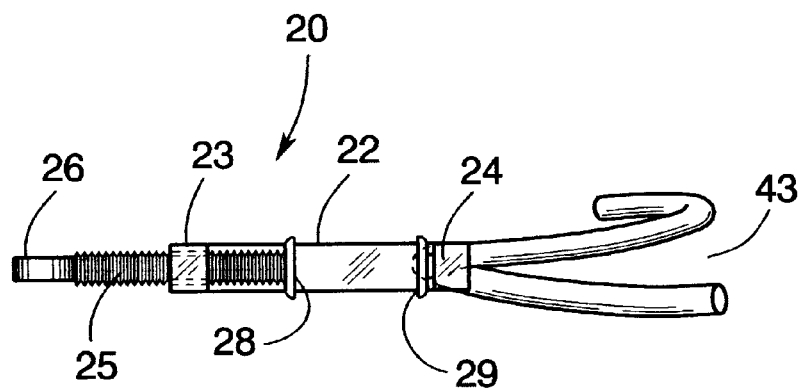
FIG. 5 is a bottom view of the cable support apparatus of FIGS. 2–4.
Figure 6:
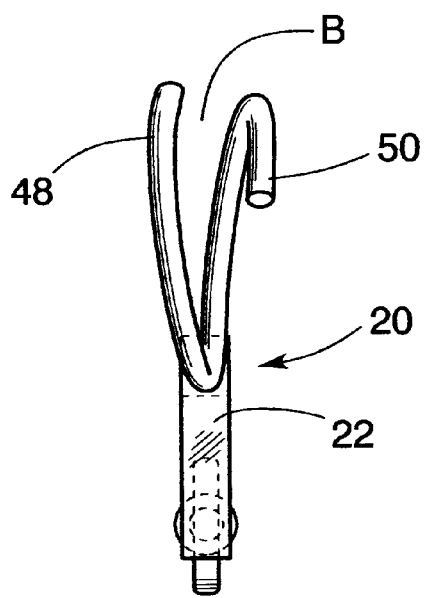
FIG. 6 a front view of the cable support apparatus of FIGS. 2–5.
Figure 7:
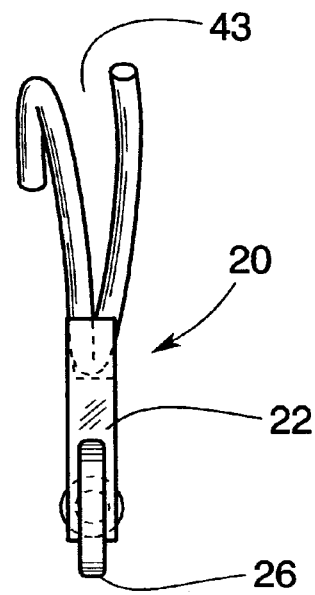
FIG. 7 is a rear view of the cable support apparatus of FIGS. 2–6.

FIGS. 2–7, illustrate one embodiment of the present invention. As can be seen in those Figures, the cable support apparatus 20 includes a C-shaped clamp member 22 that has a first leg portion 23 and a second leg portion 24. A clamping bolt 25 is threaded through the first leg portion 23 as shown. The clamping bolt 25 may have a thumbscrew end 26 or it may be fitted with a standard bolt head (not shown). Those of ordinary skill in the art will appreciate that the thumbscrew end 26 facilitates the attachment of the clamp 22 to a structure without the use of tools. As can also be seen in FIGS. 2–7, the bolt 25 may have a first clamping foot 28 attached to one end thereof to prevent the end of the bolt 25 from damaging the structure to which the device 20 is clamped. Such clamping feet are known in the art and may comprise a ball and socket arrangement that permits the foot to rotate therearound. In addition, if desired, a second clamping foot 29 may attached to the second leg 24 as shown in FIGS. 2 and 4.

As can also be seen in FIGS. 2–7, this embodiment of the present invention has a cable-receiving support member 40 attached thereto. In this embodiment, the cable-receiving support member 40 comprises a split ring member 42 that defines a central cable-receiving area, generally designated as 44 that is encircled by a rigid barrier, generally designated as 46 in FIG. 4. The split ring member 42 has two end portions 48, 50 that are spaced from each other a distance "B" to define an opening 43 therebetween which permits cables 18 to be inserted into the center area 44 of the split ring member 42. In one embodiment, for example, the distance between the ends (48, 50) of the split ring 42 may be spaced apart from each other approximately ⅜ inches from each other or other suitable distance that will permit a cable to pass therebetween (distance "B" in FIG. 6). In one embodiment, each split ring 42 is fabricated from ¼" steel round stock such that the center area 44 has an approximate inner diameter of three inches (distance "C" in FIG. 4). Those of ordinary skill in the art will appreciate, however, that the split rings 42 may be fabricated from a variety of different materials and have a variety of different shapes (i.e., rectangular, square, triangular, octagonal, etc.) and sizes best suited for supporting the particular size and numbers of cables 18 employed. For example, the split rings 42 may be fabricated from steel, stainless steel, aluminum, plastic etc. and have a rectangular, square, etc. shape when viewed from above. The split rings 42 are attached to the clamp member 22 by mechanical fastening means and methods that are appropriate for the types and sizes of materials from which the clamp member 22 and the split rings 42 are fabricated. For example, when those components are fabricated from a metal material, the split rings 42 may be welded to the clamp member 22. However, the split rings 42 may be attached to the clamp member 22 by other appropriate fastener mediums such as, for example, adhesive, etc.

The skilled artisan will also appreciate that the clamp member 22 may be fabricated from a variety of different materials. For example, the clamp member may be fabricated from a flexible material such as rubber or the like that enables the member 22 to be clamped onto a structure by flexing the legs of the clamp open to receive apportion of the structure therebetween. The clamp 22 may also be fabricated from, for example, a polymer material. Thus, a myriad of other types of clamps could conceivably be employed without departing from the spirit and scope of the present invention.

Figure 8:
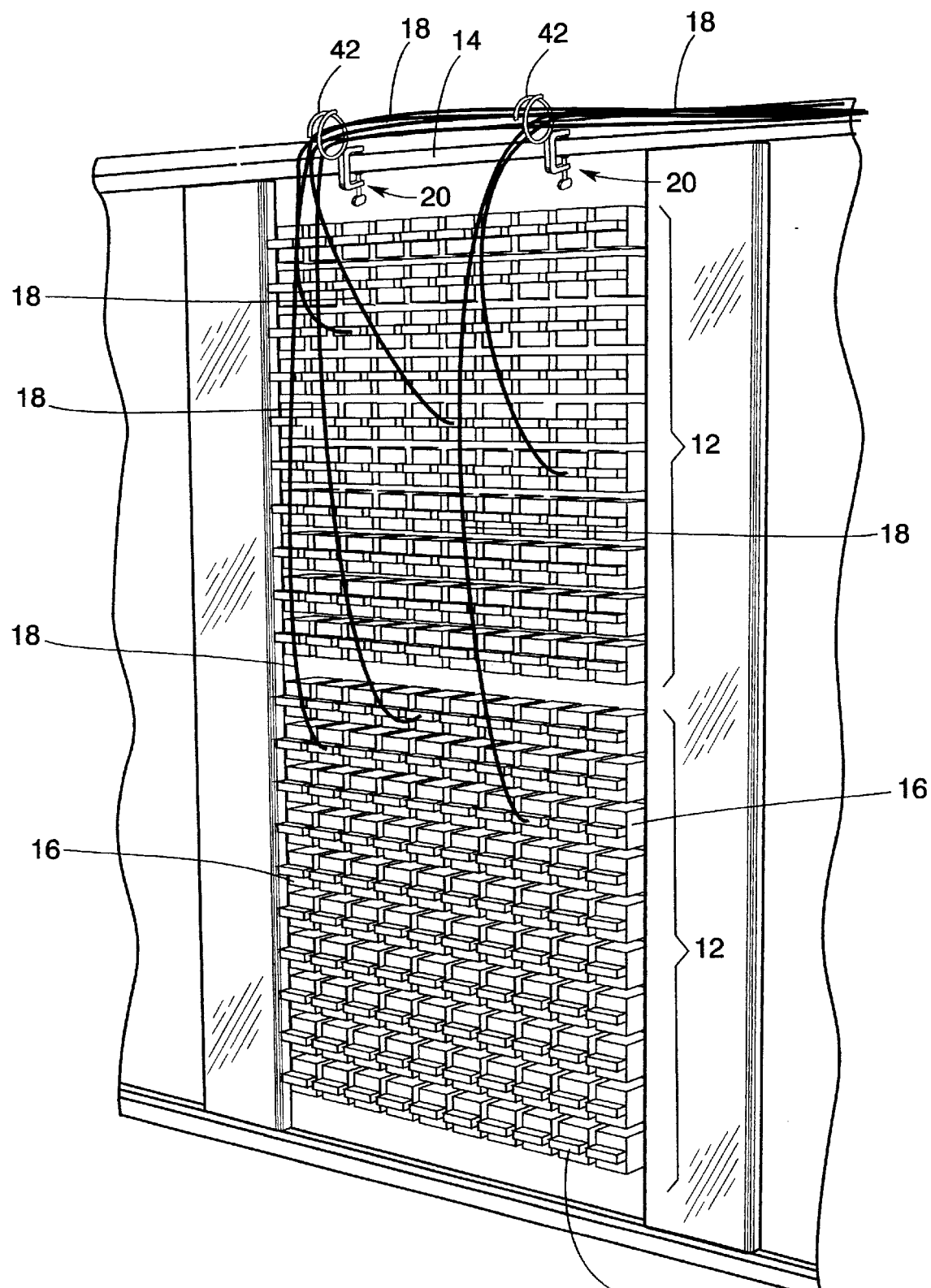
FIG. 8 is a partial perspective view of a pair of typical protector bays the two cable support apparatuses of the present invention used on connection therewith.

FIG. 8, illustrates one of the many uses of the cable support apparatus of the present invention. As can be seen in that Figure, apparatuses 20 are used in connection with a plurality of protector bays 12 that contain a plurality of protector blocks 16. The protector bays 16 are movably supported by a framework, generally designated as 14. The apparatuses 20 are simply clamped onto a portion of the frame 14 by clamping a portion of the frame between the first and second foot pads. As can also be seen in that Figure, a plurality of cables 18 are inserted through the space between the ends of the split ring 42 such that they can enter the center area 44 thereof and be retained therein as shown. As evidenced by FIG. 8, by employing the present invention, much of the clutter and obstruction of the various protector blocks is minimized and eliminated while permitting easy access and removal of the various cables as desired. It will be further appreciated that the cable support members 20 may be installed to support various cables 18 without having to detach one end of the cable 18 to feed it through the split ring 42.

Figure 9:
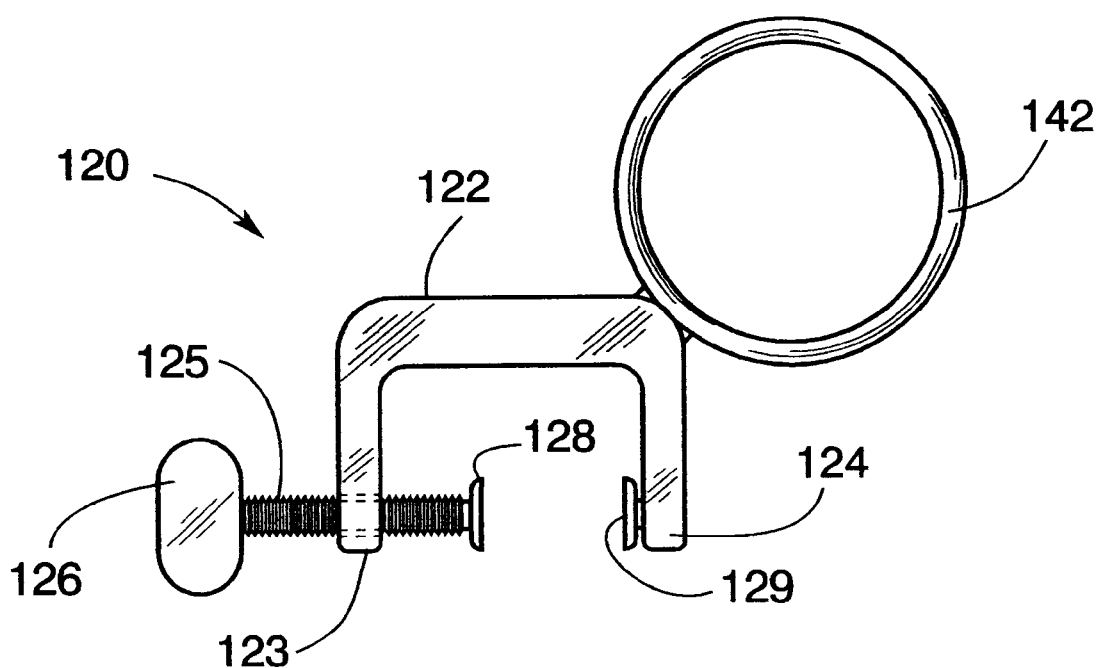
FIG. 9 is a side elevational view of another embodiment of the present invention.

Another embodiment of the present invention is shown in FIG. 9. The device 120 includes a C-shaped clamp member 122 that has a first leg 123 and a second leg 124. A bolt 125 is threaded through the first leg 123. A thumbscrew end 126 may be attached to the end of the bolt 125. A foot pad 128 may be attached to the other end of the bolt 125 and a second footpad 129 may be attached to the inside of the second leg 124 of the C-shaped clamp member 122. In this embodiment, a cable-receiving support member 140 in the form of a complete ring 142 is attached to the clamp member 122. In this embodiment, however, one end of the cable would have to be fed through the ring 142 during installation.

Thus, from the foregoing discussion, it is apparent that the present invention solves many of the problems encountered when installing wires and cables in junction boxes, cabinets, etc. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. A cable support apparatus, comprising:
   a clamp; and
   a substantially rigid cable-receiving support member having a first free end and a second free end that overlaps said first free end and is spaced from said first free end a distance for permitting at least one cable to be inserted between said first and second free ends, said cable-receiving support member attached to said clamp at a point on said cable receiving support member between said first and second free ends.

2. The cable support apparatus of claim 1 wherein said clamp comprises:
   a C-shaped body; and
   a threaded thumb screw attached to said C-shaped body.

3. The cable support apparatus of claim 1 wherein said cable-receiving support member comprises a split ring.

4. The apparatus of claim 3 wherein said split ring has a substantially round shape.

5. The apparatus of claim 3 wherein said split ring is fabricated from a metal rod.

6. A cable supporting apparatus, comprising:
   a C-shaped body;
   a threaded thumbscrew attached to said C-shaped body;
   a split ring defining a central cable-receiving area having a perimeter surrounded by rigid portions of said split ring, said split ring further having a first free end and a second free end overlapping said first free end and spaced therefrom to define an access area for permitting a cable to be inserted into the cable-receiving area.

7. A method of supporting at least one cable attached to at least one component supported by a framework, said method comprising:
   clamping a split ring to the framework, wherein the split ring defines a central cable-receiving area that has a perimeter defined by a rigid member that has a first free end and a second free end overlapping the first free end and spaced therefrom to form an opening between the first and second free ends to permit a cable to be inserted therebetween into the cable-receiving area; and
   inserting at least one cable through the opening into the cable-receiving area.

* * * * *